No. 811,338. PATENTED JAN. 30, 1906.
A. P. SWEENY.
CUTTING AND MEASURING MACHINE.
APPLICATION FILED DEC. 16, 1904.

6 SHEETS—SHEET 2.

WITNESSES:
H. C. Abbott
S. H. Cox

INVENTOR
Alfred P. Sweeny
BY
ATTORNEYS

No. 811,338. PATENTED JAN. 30, 1906.
A. P. SWEENY.
CUTTING AND MEASURING MACHINE.
APPLICATION FILED DEC. 16, 1904.

6 SHEETS—SHEET 3.

WITNESSES:

INVENTOR
Alfred P. Sweeny
BY
ATTORNEYS

No. 811,338. PATENTED JAN. 30, 1906.
A. P. SWEENY.
CUTTING AND MEASURING MACHINE.
APPLICATION FILED DEC. 16, 1904.
6 SHEETS—SHEET 4.
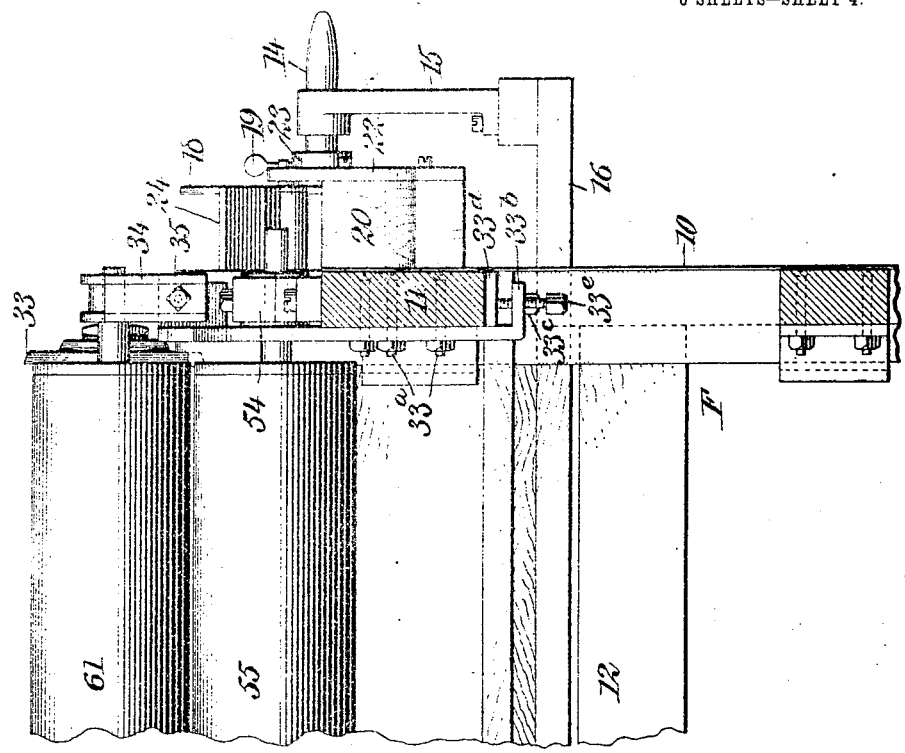
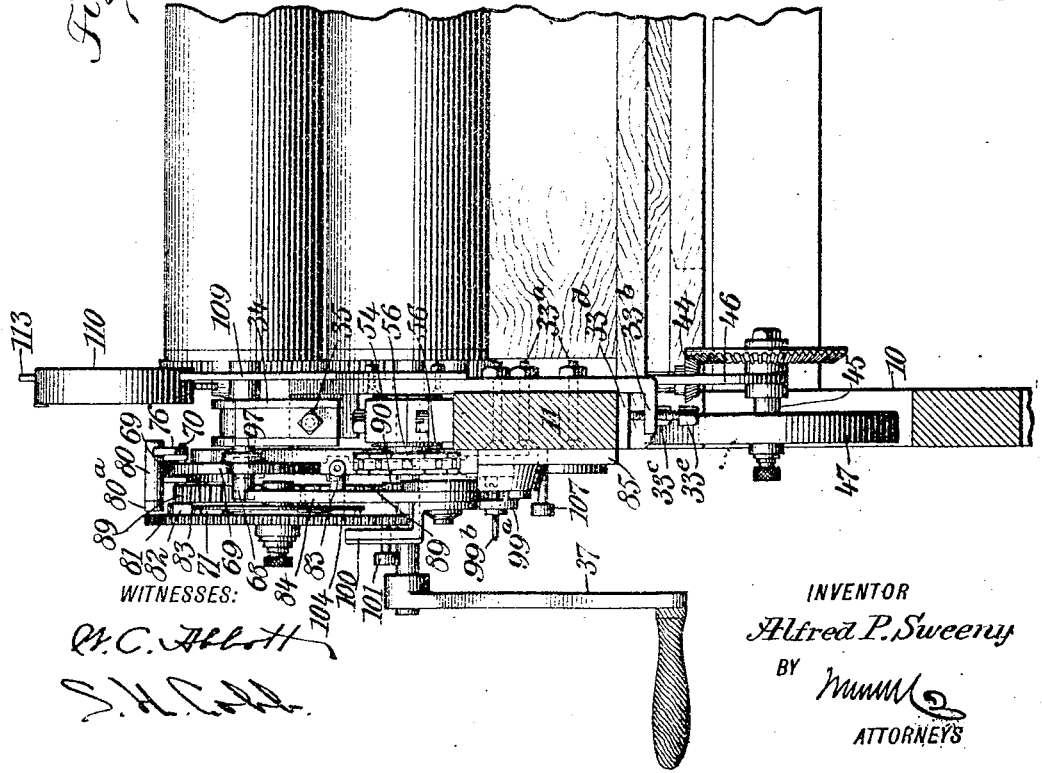
Fig. 5.
WITNESSES:
INVENTOR
Alfred P. Sweeny
BY
ATTORNEYS

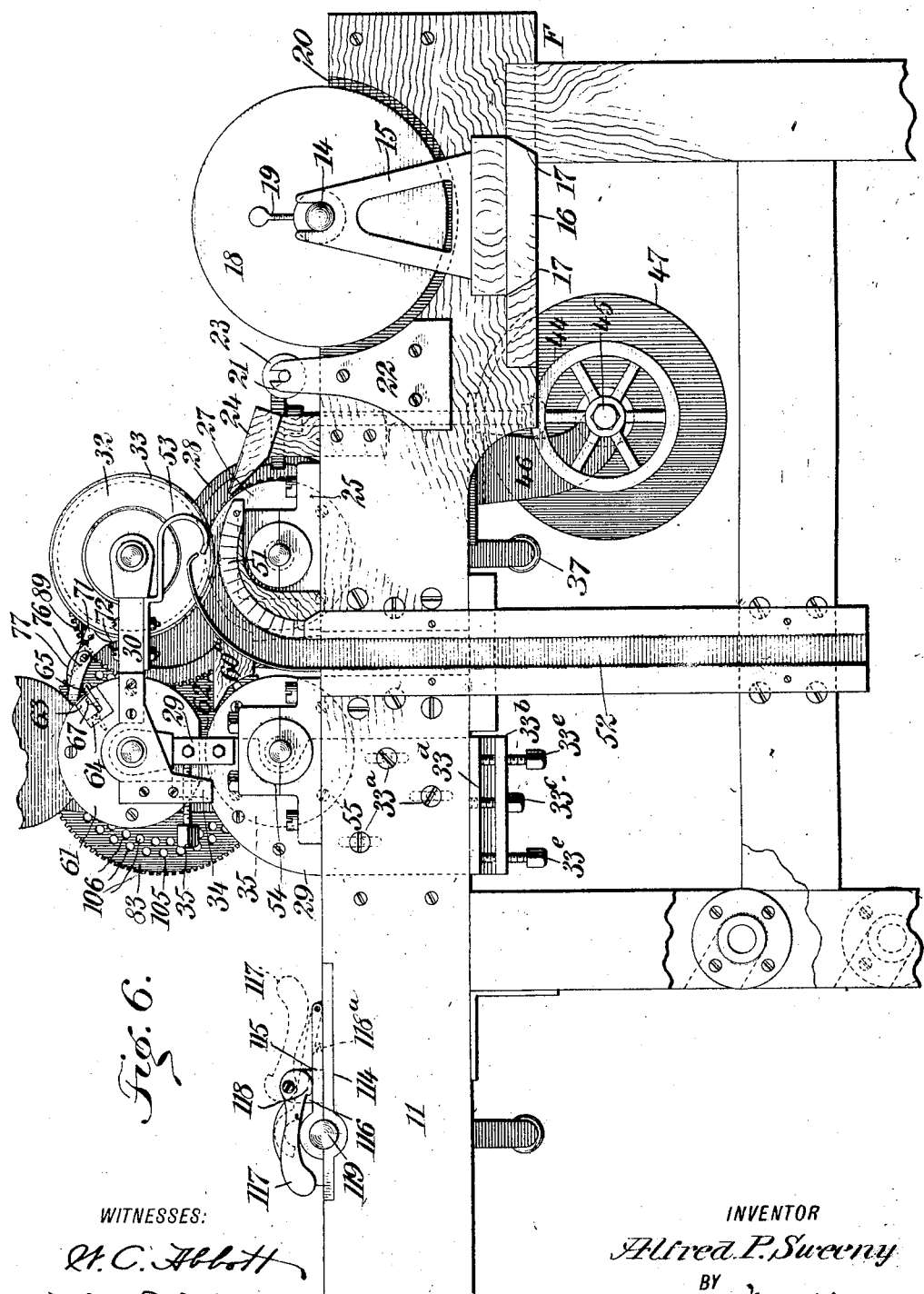

No. 811,338. PATENTED JAN. 30, 1906.
A. P. SWEENY.
CUTTING AND MEASURING MACHINE.
APPLICATION FILED DEC. 16, 1904.
6 SHEETS—SHEET 6.
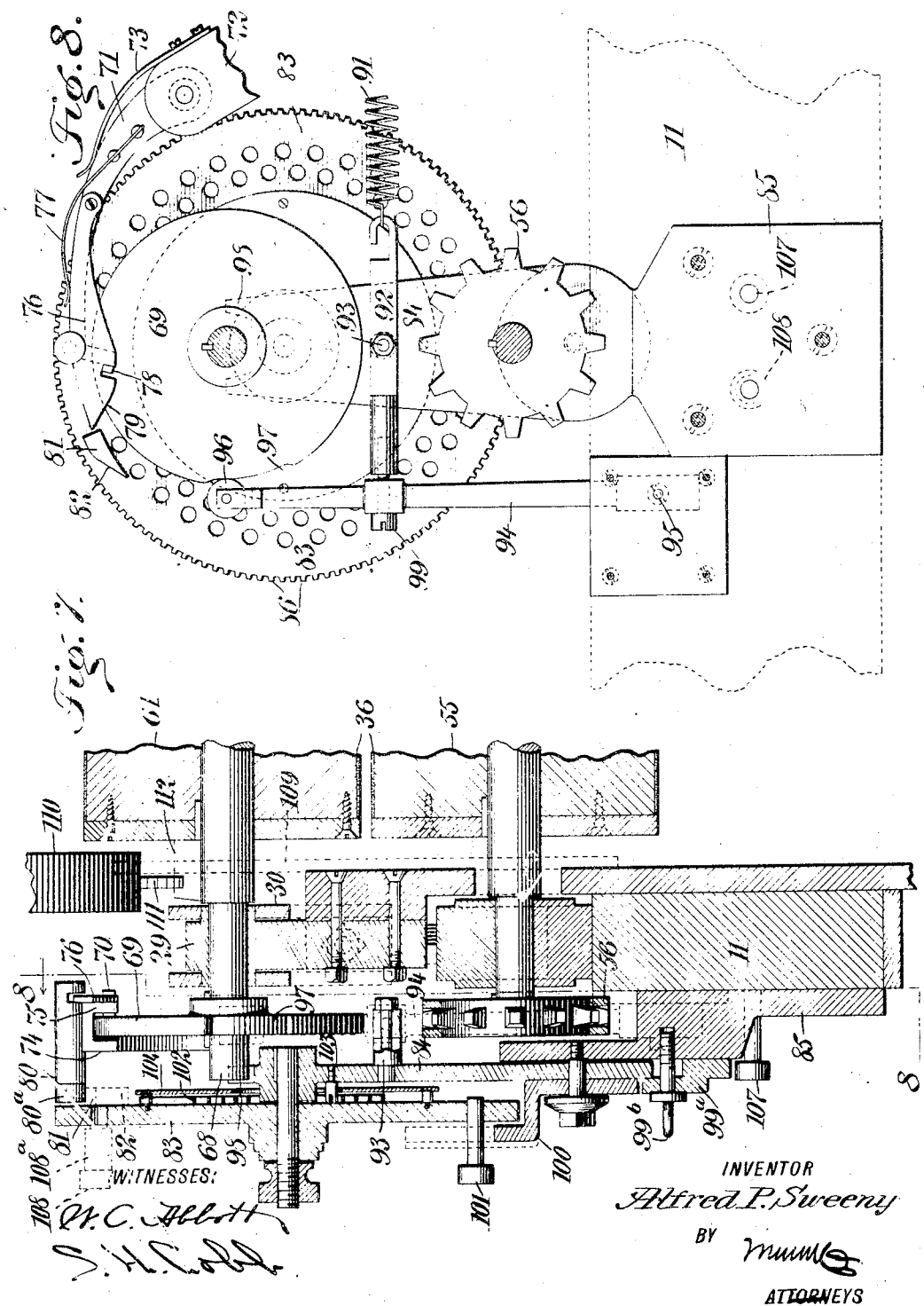
INVENTOR
Alfred P. Sweeny
BY
ATTORNEYS
WITNESSES:

UNITED STATES PATENT OFFICE.

ALFRED PIERRE SWEENY, OF HELENA, MONTANA.

CUTTING AND MEASURING MACHINE.

No. 811,338.

Specification of Letters Patent.

Patented Jan. 30, 1906.

Application filed December 16, 1904. Serial No. 237,080.

*To all whom it may concern:*

Be it known that I, ALFRED PIERRE SWEENY, a citizen of the United States, and a resident of Helena, in the county of Lewis and Clarke and State of Montana, have invented a new and Improved Cutting and Measuring Machine, of which the following is a full, clear, and exact description.

My invention relates to apparatus for cutting and measuring fabrics and like sheet material, it being particularly adapted for trimming window-shade cloth and dividing it into definite lengths to furnish the shades.

It has for its principal objects the provision of an efficient machine which will successively cut and measure the lengths automatically and which will perform either of these operations separately.

Reference is to be had to the accompanying drawings, forming a part of this specification, in which similar characters of reference indicate corresponding parts in all the views.

Figure 1:
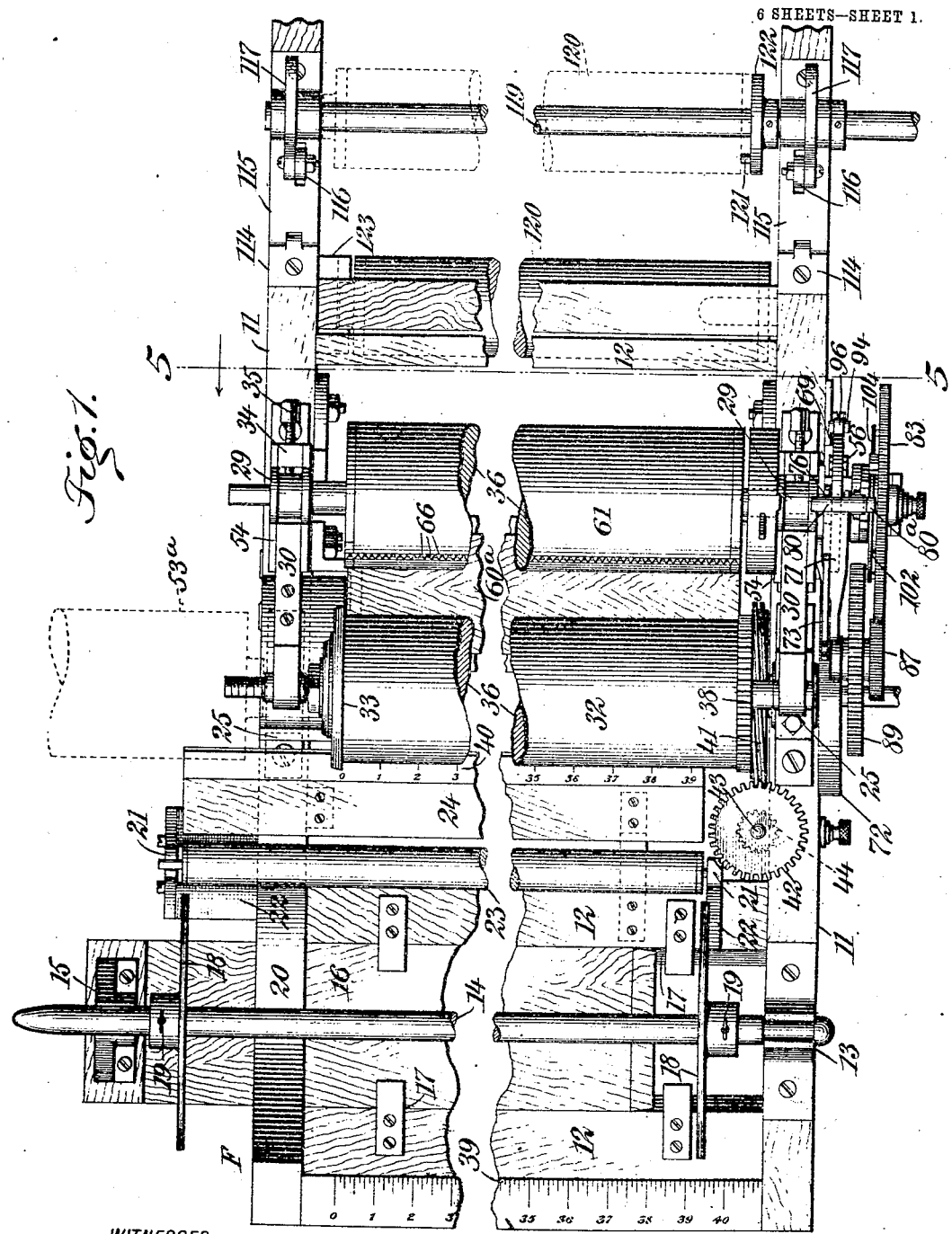
Figure 2:
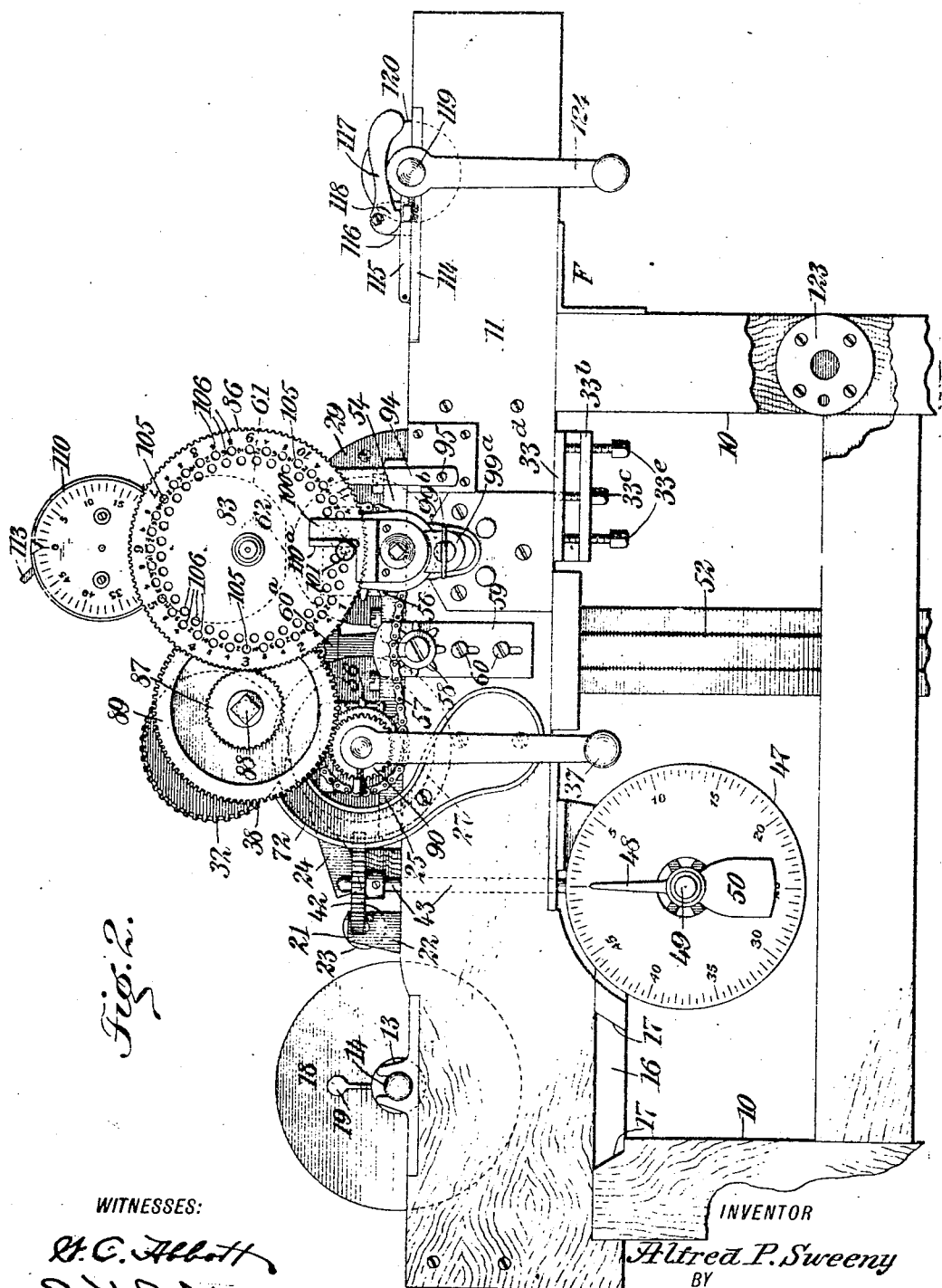
Figure 3:
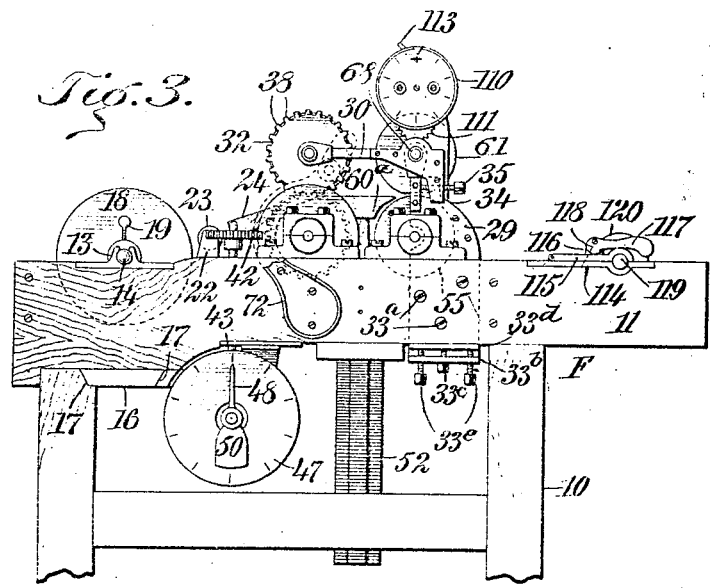
Figure 4:
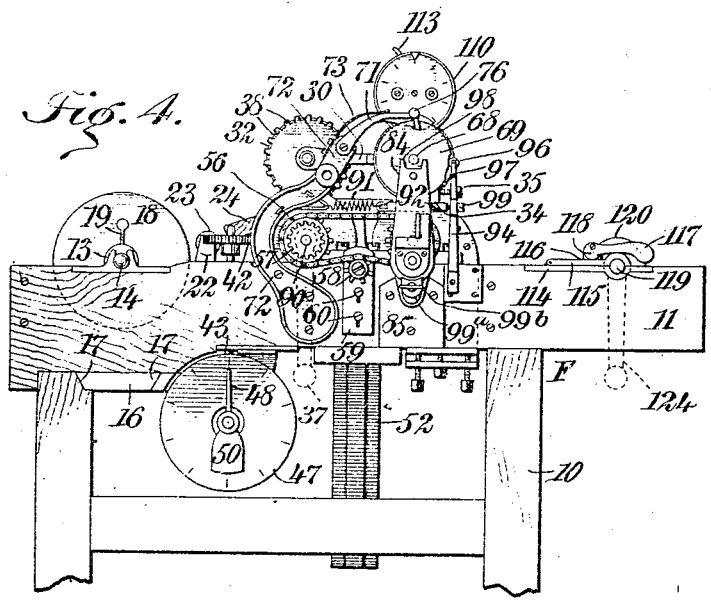

Figure 1 is a broken top plan view of one embodiment of my invention. Fig. 2 is a side elevation thereof, showing the side upon which the controlling mechanism is mounted. Figs. 3 and 4 are views similar to Fig. 2 with portions of the gearing and associated elements removed. Fig. 5 is a vertical transverse section on the line 5 5 of Fig. 1. Fig. 6 is a broken side elevation looking at the opposite side from that shown in Fig. 2. Fig. 7 is an enlarged vertical transverse section through the controlling mechanism, and Fig. 8 is a longitudinal section therethrough on the line 8 8 of Fig. 7.

F designates a main or supporting frame, which may consist of uprights 10, side bars 11, and connecting cross-bars 12. Mounted upon a side bar near one extremity of the frame is an open bearing 13, in which is journaled the spindle 14 of a delivery or supply roll, having its opposite end rotatable in a similar bearing 15, which is preferably mounted upon a slide 16, Figs. 1 and 6, movable in ways 17 beneath the side bars. This arrangement provides for a lateral adjustment permitting the application of rolls of various lengths, which may be greater than the width of the frame. Upon the spindle are shown opposite check-pieces 18 18, which may be fixed in position by set-screws 19. The side bar toward the bearing 15 is cut away at 20 to allow the passage of the delivery-roll when its length necessitates this.

Situated forwardly of the frame from the delivery-roll are bearings 21 21, which, as illustrated, are carried upon brackets 22, secured to the side bars, these bearings having rotatable in them the journals of a guide-roll 23. Just beyond this guide-roll is a guide-bar 24, upwardly inclined therefrom (see Fig. 6) and supported upon blocks fixed to the frame.

Adjacent to the guide-bar and on the opposite side from the guide-roll are bearings 25 25, Fig. 6, carried by the side bars and receiving the journals of a roll 27, having at one extremity an annular cutting-blade 28. Secured to the inner sides of the side bars, beyond the bearings of the roll 27, are standards 29, upon which are pivoted arms 30, extending over the bearings of the roll 27 and having journaled in them a coacting roll 32, which carries a cutting-blade 33, overlapping the blade 28. Each of the standards may be fastened to the frame by bolts $33^a$, extending through elongated openings therein. At its lower end the standard has a flange $33^b$, through an opening in which passes a drawbolt $33^c$, threaded into a plate $33^d$, attached to the lower face of the side bar, while at each side of this bolt is a pressure-bolt $33^e$, threaded through the flange and contacting with the plate. By loosening the bolts $33^a$ the standard may be raised and lowered by means of the flange-bolts, thus allowing the parts to be properly positioned in setting up the machine. The arms 30 preferably have depending projections 34, through which are threaded screws 35, which may be turned into contact with the standards, varying the position of the roll 32 and its pressure against the lower roll. Both the cutting-rolls may be covered with felt, as indicated at 36, Fig. 1. Upon one extended end of the journal of the roll 27 may be secured a crank or driving member 37, Fig. 2, by which rotation may be imparted to the roll, while its companion is compelled to rotate with it at the same speed by spur-gearing 38.

Upon the outer cross-bar of the frame, at the rear of the delivery-roll, is fixed or inscribed a scale 39, while upon the guide-bar 24 is placed a similar scale 40, the zeros of both being in alinement longitudinally with the meeting line of the cutting-blades. This permits the edge of the material to be operated upon to be squared with respect to the cutting-rolls when it is entered between them.

Upon the journal of the lower cutting-roll, outside its gear 38, is fixed a worm 41, Fig. 1, coacting with a worm-wheel 42, Figs. 1 and 2, fast upon a vertical shaft 43, journaled just within the adjacent side bar. This shaft is connected by bevel-gearing 44, Fig. 5, with a horizontal shaft 45, rotatable in a hanger 46. Mounted upon the frame, with the shaft 45 extending through its center, is a dial 47, graduated in some unit of length—as feet, for example—over which graduations moves a pointer 48, which may be fixed upon the shaft 45 by a nut 49. The pointer is shown as weighted at 50, so that upon loosening the nut it will at once be returned by gravity to its zero position and there locked to repeat its registration.

Over the box of the roll 27, at the side toward the cutting-blades, extends a curved housing 51, Fig. 6, which is continued by the wall of a trough-shaped guide 52, projecting downwardly below the rolls. Lying in close proximity to the extremity of the end of the upper wall of the guide 52 is a guide member 53, carried by the adjacent arm 30.
These guides receive the severed strip, or what would ordinarily constitute the waste, outside the cutting-blades and deflect it from the movable elements of the machine. To further support this strip, this being of particular utility if it be of considerable width, the extremity of the journal of the roll 27 adjacent to the guides is threaded to receive a cylindrical extension or roll 53ª, (Fig. 1, dotted lines,) which may be screwed thereon.

At the opposite side of the guide from the cutting-rolls, secured to each of the side bars, is a bearing 54 for the journals of a bed or supporting roll 55, which is shown as driven at the same speed as and by the lower cutting-roll through sprocket-wheels 56, connected by a chain 57, Figs. 2 and 4. To support and take up any slack in this chain an idler 58 may be provided, rotatable upon a plate 59 and adjustably mounted upon the frame by screws 60, extending through vertical slots in said plate. Between the lower cutting-roll and the bed-roll, with its upper surface preferably somewhat lower than their peripheries, is an apron or supporting-bar 60ª, extending between the sides of the frame.

Journaled in bearings near the upper extremities of the standards 29 is a generally cylindrical measuring and dividing roll 61, which has a flattened peripheral portion 62, Figs. 2 and 6. Both this measuring-roll and its companion or bed roll may be covered with felt, similarly to the cutting-rolls. In the surface of the measuring-roll is a longitudinal groove 63, Fig. 6, situated somewhat at one side of a vertical through the flattened portion, and in this recess is mounted an angle-iron 64, having attached to it a blade 65, provided with sharp puncturing-teeth 66, Fig. 1, which project beyond the roll periphery. To vary the extension of these teeth beyond the surface, the blade may be attached to the angle-iron by screws 67, extending through radial slots therein.

The journal 68 of the roll 61 is extended beyond its bearing, Figs. 7 and 8, and there has fast upon it a locking member or disk 69, having at its inner side a locking projection 70. With this projection coöperates a latch 71, Figs. 4 and 8, pivoted upon an arm 72, rising from a side bar of the frame and being held normally inward toward said projection by a spring 73, fixed to the arm. The inward movement of the latch is limited and is held against lateral displacement by a portion 74, Fig. 7, straddling the disk and having a contact-face 75, with which the projection coacts. Upon the latch 71 is pivoted an auxiliary latch 76, Fig. 8, held inwardly with relation to the locking-disk by means of a spring 77, attached to the main latch and having a recess 78 to receive the projection 70, an inclined contact-face 79 leading to this recess from the extremity of the latch. From the outer side of the main latch is a lateral projection 80, preferably carrying a roll 80ª for coaction with a lug or projection 81, having an inclined contact-face 82 and carried upon the inner surface of a controlling member or disk 83. This controlling-disk is rotatable about a stub-shaft carried by the upper end of an arm 84, Figs. 7 and 8, pivoted upon a bracket 85, secured to the side bar of the frame beneath the controlling mechanism. The circumference of the disk 83 is toothed at 86, and with these teeth meshes a pinion 87, Fig. 2, rotatable about a shaft 88, carried by the fixed arm 72, Fig. 4. Turning with the pinion is a gear 89, coöperating with a pinion 90, secured upon the journal of the roll 27. This gearing between the roll and the controlling-disk may be such as to give a twelve-to-one reduction—that is, the disk makes one complete rotation for twelve of the roll—said roll, as well as its companions, being preferably one foot in circumference. The disk-gear and its pinion are normally held in mesh by a spring 91, Figs. 4 and 8, here shown as of the spiral type and extending from the arm 72 to a bar 92, which is loosely mounted upon a pin 93, projecting from the inner side of the arm 84. This bar is shown as extended at the opposite side of the pin and is connected to an arm 94, pivoted at 95, Fig. 8, upon the supporting-frame and having a roll 96 drawn into contact with the periphery of the locking-disk by the spring 91. The edge of the locking-disk is irregular or cam-shaped, having a depression 97, which the roll may enter, in this position the gearing of the controlling-disk being in mesh, while when the roll 96 rides upon the circular portion of the locking-disk the teeth of the controlling-disk and its pinion are separated. The arm 84 may be bifurcated at 98, Figs. 4 and 8, it resting against the inner side of the hub of the controlling-disk and steadying it. The connection between the bar 92 and the arm 94 may be by means of a screw 99, extending through the latter and threaded into the former. This allows a variation in the relation between the arms 84 and 94, so that the bifurcations of the former may be maintained normally out of contact with the journal 68. The arm 84 may be temporarily fixed with the controlling-disk out of mesh, so that the measuring mechanism will not operate, by means of a clamp member 99ª, Figs. 4 and 7, extending over the lower end of the arm and drawn into contact therewith by a thumbscrew 99ᵇ, passing through an opening in the clamp member and threaded into the bracket 85.

Mounted upon the arm 84 and extending over the lower edge of the controlling-disk is a stop member 100, Figs. 2 and 7, having at one side a contact-face 100ª. With this face coacts a projection 101 from the outer side of the disk, it being normally held in contact therewith by means of a spring 102, Fig. 7, attached to the disk-hub and to a pin 103, fixed to the arm 84. This spring may be housed or held in position by a plate 104, mounted upon the disk at the proper distance from its surface. Near its circumference the controlling-disk is divided by a series of openings 105, Fig. 2, into what in the present instance is shown as twelve equal parts, each representing one rotation of the rolls or a foot of advance of material. Between these openings 105 are similar openings 106, of which there are shown five between each two of the divisions, these representing even inches. The openings receive a pin 107, the diameter of which is substantially that of said openings, and also a pin 108, which has an end portion fitting the openings, and an enlarged portion 108ª, which equally divides the space between the openings 106, and thus providing for the odd inches. When not in use, both pins may be carried in suitable openings in the bracket 85, as is best shown in Fig. 2 of the drawings.

Carried by a bracket 109, Fig. 5, which may be mounted on one of the standards 29, is a counter 110, from the casing of which extends an actuating-wheel 111, Fig. 3, rotatable by a projection 112, Fig. 7, from the journal 68. This counter is advanced one division for each rotation of the wheel 61, this indicating that a length of shade has passed. It may be provided with a lever 113 for restoring it to zero.

At the opposite extremity of the frame from the delivery-roll are bearings, which may each consist of a bottom plate 114, Figs. 1 and 2, fixed upon a side bar, and a top plate 115, hinged to the bottom plate. From said bottom plate rises a lug 116 through a slot in the top plate and has fulcrumed near its upper end a lever 117, provided with a cam portion 118, which when in the position shown in full lines in Fig. 6 contacts with the upper plate and locks the parts of the bearings together, but when thrown back, as appears in dotted lines, allows the top plate to be raised conveniently by a spring 118ª. This enables the introduction or removal of a spindle 119 of a receiving-roll, which may either have the cut material wound directly upon it, its end being attached thereto by suitable clamps, or may receive separable sleeves 120, which have at one end a recess engaged by a pin 121, projecting from the inner side of a cheekpiece 122, fixed upon the spindle. To these sleeves the material may be fastened in the same manner, and when not in use they may be supported upon suitable rack members 123, Fig. 2, fixed to the frame-uprights. At one end of the spindle 119, preferably upon the side of the frame at which is secured the crank 37, is a similar crank or driving member 124.

It being desired to simultaneously trim the material and divide it into measured sections, the clamp of the arm 84 is loosened, so that the gearing of the controlling-disk may be held in mesh by the spring 91, a roll of material placed upon the spindle 14 and its end drawn over the guide-roll and guide-bar and adjusted to the width which is to be cut and at the same time squared by means of the scales. It is then started between the cutting-rolls and advanced by turning the crank 37 until it can be drawn over the bed-roll, above which is left a space furnished by the flattened portion of the dividing-roll, (see Figs. 2 and 6,) the latter roll being out of contact with the material. From this point the end of the material is advanced to the receiving-roll and secured thereto. In performing these operations the cutting-blades will have been rotated by the gearing and the strip left at the outer side will be directed by the guides downwardly from the roll. Now suppose one wishes to measure and mark the material into five-foot lengths. The controlling-disk is turned against the tension of its spring until the opening corresponding to the main graduation "5" appears at the left of the contact-face of the stop member 100 (see Fig. 2) and the pin 107 inserted therein. The material is now advanced by turning the crank 124, its cutting continuing, as has been previously described. As each of the openings 105 reaches the contact-face of the stop member, the controlling-disk being rotated by its gearing, the cutting and measuring rolls will have performed one complete rotation and one foot of material will have been drawn from the delivery-roll. This continues until the fourth division 105 passes by the stop member, when the projection upon the inner face of the controlling-disk engages the latch, the latter riding up the inclined face of the projection and freeing the projection of the locking-disk. The angle-iron and puncturing-plate so weights the measuring-roll that upon the locking-disk being freed said roll at once begins to rotate, this bringing its cylindrical portion into contact with the moving material, which continues its rotation. Simultaneously the depression in the periphery of the locking-disk will be carried away from the roll of the arm 94, causing this to be moved by the cylindrical periphery of the disk until the teeth of the controlling-disk are carried out of mesh with its pinion. This latter disk thus being freed, its spring immediately returns it to the initial position, in which the pin 101 is in contact with the face of the stop member. During this return movement the rotation of the measuring-roll will have continued until its puncturing-blade acts upon the material, indicating the end of the section. This rotary movement goes on until the locking projection reaches the latch, at which time it will strike the contact-face of the main latch and be caught by the recess of the auxiliary latch to prevent rebound, and when thus locked the roll of the arm 94 has assumed its position in the cam depression and the gearing of the controlling-disk is again in mesh. In this position the flattened portion of the measuring-roll is opposite the bed-roll, leaving the space through which the material freely passes, and the operation is again repeated. It will be obvious that the puncturing-blade acts with reference to the measuring operation at an intermediate point in the rotation of the measuring-roll. This results in the last foot being divided between adjacent sections of the material without impairing the accuracy of the measurement. If the sections were to be in feet, and even inches rather than in feet, the pin 107 would be placed in the proper intermediate opening, or if odd inches were to be measured the pin 108, having the portion of greater diameter, would be substituted. While the material is traveling through the rolls its length is being registered upon the dial 47 and the number of sections marked indicated by the counter. If material is to be trimmed and not divided, the controlling-disk is swung out of mesh with its pinion and its arm fixed in this position by means of the clamp. This throws the controlling mechanism temporarily out of operation. If, on the other hand, a strip is to be divided and not trimmed, the material is so entered between the cutting-rolls that it will not be operated upon by the blades.

Having thus described my invention, I claim as new and desire to secure by Letters Patent—

1. A measuring-machine comprising a supporting-frame, a rotatable measuring member journaled upon the frame and weighted at one portion of its periphery for overcoming the inertia of said member, and means for locking the measuring member with its weighted portion at one side of the vertical through its journals.

2. A measuring-machine comprising a generally cylindrical measuring-roll having a flattened portion.

3. A measuring-machine comprising a supporting-roll, a rotatable roll having a flattened portion, and means for locking the last-named roll in position with the flattened portion adjacent to the supporting-roll.

4. A measuring-machine comprising a measuring-roll, a lock for the roll, and a rotatable controlling member having a projection for contact with the lock.

5. A measuring-machine comprising a measuring-roll and a lock for the roll comprising a movable latch and an independent movable auxiliary latch pivoted thereto.

6. A measuring-machine comprising a measuring-roll, a lock for the roll, a rotatable controlling member for operating upon the lock, means for turning the controlling member in one direction, and a spring resisting the turning movement.

7. A measuring-machine comprising a measuring-roll, a lock for the roll, and a rotatable controlling member having a projection for contact with the lock and a projection variable in position upon the controlling member, for controlling the operation of the controlling member.

8. A measuring-machine comprising a measuring-roll, a lock for the roll, a rotatable controlling member, means on the controlling member for releasing the lock and means for moving the controlling member when released from the lock.

9. The combination with a rotatable roll, of a locking-disk rotatable therewith, a latch coöperating with the locking-disk, a controlling-disk for releasing the latch, and means for rotating the controlling-disk.

10. The combination with a rotatable roll, of a locking-disk rotatable therewith, a latch coöperating with the locking-disk, a controlling-disk for releasing the latch, and gearing for rotating the controlling-disk.

11. The combination with a rotatable roll, of a locking-disk rotatable therewith, a latch coöperating with the locking-disk, a controlling-disk for releasing the latch, gearing for rotating the controlling-disk in one direction, and means for rotating the controlling-disk in the opposite direction.

12. The combination with a rotatable roll, of a locking-disk rotatable therewith, a latch coöperating with the locking-disk, a controlling-disk for releasing the latch, gearing for rotating the controlling-disk in one direction, and a spring for rotating the controlling-disk in the opposite direction.

13. The combination with a rotatable roll, of a locking-disk rotatable therewith, a latch coöperating with the locking-disk, a controlling-disk for releasing the latch, gearing for rotating the controlling-disk, and means for moving the gearing into and out of coaction, whereby to release the controlling-disk.

14. The combination with a rotatable roll, of a locking-disk rotatable therewith, a latch coöperating with the locking-disk, a controlling-disk for releasing the latch, gearing for rotating the controlling-disk, and means operable by the locking-disk for moving the gearing into and out of coaction, whereby to release the controlling-disk.

15. The combination with a rotatable roll, of a locking-disk rotatable therewith, a latch coöperating with the locking-disk, a bodily-movable controlling-disk, and connections between the locking and controlling-disks for effecting this bodily movement.

16. The combination with a rotatable roll, of a locking-disk rotatable therewith, a latch coöperating with the locking-disk, a pivoted arm, a controlling-disk rotatable upon the arm, and a lever connected with the controlling-disk and movable by the locking-disk.

17. The combination with a rotatable roll, of a locking-disk rotatable therewith and having a cam-shaped periphery, a latch coöperating with the locking-disk, a pivoted arm, a controlling-disk rotatable upon the arm, and a lever connected with the controlling-disk and contacting with the periphery of the locking-disk.

18. The combination with a rotatable roll, of a locking-disk rotatable therewith, a latch coöperating with the locking-disk, a bodily-movable controlling-disk, connections between the locking and controlling disks for effecting this bodily movement, and means for fixing the controlling-disk against bodily movement.

19. A measuring-machine comprising a measuring-roll, a lock for the roll, a rotatable controlling member having a projection for contact with the lock and also having a series of openings, a pin which may be located in one or another of the openings, and a stop member with which the pin contacts.

20. A measuring-machine comprising a measuring-roll, a lock for the roll, a rotatable controlling member having a projection for contact with the lock and also having a series of openings, a pin which may be located in one or another of the openings, a stop member with which the pin contacts, and a spring serving to move the pin toward the stop member.

21. A measuring-machine comprising a measuring-roll, a lock for the roll, a rotatable controlling member having a projection for contact with the lock and also having a series of openings, a pin which may be located in one or another of the openings, a stop member with which the pin contacts, a spring serving to move the pin toward the stop member, and gearing for moving the pin in the opposite direction.

22. The combination with a supporting-frame, of a delivery-roll for the material, rolls for operating upon the material, a scale situated adjacent to the operating-rolls, and a second scale mounted upon the frame on the opposite side of the delivery-roll from the first-named scale.

23. The combination with a supporting-frame, of a delivery-roll and a receiving-roll mounted near opposite ends thereof, a pair of cutting-rolls situated adjacent to the delivery-roll, and a measuring-roll located between the cutting-rolls and the receiving-roll.

24. The combination with a supporting-frame, of bearings mounted near opposite eads thereof, a delivery-roll journaled in one set of bearings, a receiving-roll journaled in the other set, a driving member connected with the receiving-roll, means for removably locking said receiving-roll in its bearings, and cutting and measuring rolls situated between the delivery and receiving rolls.

In testimony whereof I have signed my name to this specification in the presence of two subscribing witnesses.

ALFRED PIERRE SWEENY.

Witnesses:
JOHN D. MCLEOD,
FORREST J. SMITH.